(12) United States Patent
Carru et al.

(10) Patent No.: US 10,862,873 B1
(45) Date of Patent: *Dec. 8, 2020

(54) MESSAGE-BASED DATABASE REPLICATION

(71) Applicant: Snowflake Inc., San Mateo, CA (US)

(72) Inventors: Damien Carru, New York, NY (US); Robert Bengt Benedikt Gernhardt, Seattle, WA (US); Martin Hentschel, Berlin (DE); Nithin Mahesh, Redmond, WA (US); Eric Robinson, Sammamish, WA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,191

(22) Filed: Apr. 30, 2020

Related U.S. Application Data

(63) Continuation of application No. 16/863,031, filed on Apr. 30, 2020.

(51) Int. Cl.
  *H04L 29/06* (2006.01)
  *G06F 16/27* (2019.01)
  *H04L 9/30* (2006.01)

(52) U.S. Cl.
  CPC ......... *H04L 63/0435* (2013.01); *G06F 16/27* (2019.01); *H04L 9/3073* (2013.01)

(58) Field of Classification Search
  None
  See application file for complete search history.

(56) References Cited

U.S. PATENT DOCUMENTS

| | | | | |
|---|---|---|---|---|
| 5,241,598 A * | 8/1993 | Raith | ........................ | H04L 9/12 380/248 |
| 10,298,548 B2 * | 5/2019 | Araki | .................. | H04L 63/0428 |
| 10,430,599 B1 * | 10/2019 | Whitmer | ............. | G06F 21/6218 |
| 10,657,261 B2 * | 5/2020 | Kumar | .................. | H04L 9/0877 |
| 2002/0037736 A1 * | 3/2002 | Kawaguchi | ............. | H04W 4/08 455/518 |
| 2002/0110245 A1 * | 8/2002 | Gruia | .................... | H04L 9/0891 380/278 |
| 2003/0177093 A1 * | 9/2003 | Hirano | ............... | H04N 21/8355 705/50 |
| 2003/0200176 A1 * | 10/2003 | Foster | ...................... | H04L 9/12 705/51 |

(Continued)

OTHER PUBLICATIONS

Martin Hentschel, Peter Povinec, "End-To-End Encryption in the Snowflake Data Warehouse", Snowflake Blog, Apr. 2016, (Year: 2016).*

(Continued)

*Primary Examiner* — Piotr Poltorak
(74) *Attorney, Agent, or Firm* — Schwegman Lundberg & Woessner, P.A.

(57) ABSTRACT

A networked device communication system can configure network devices (e.g., a primary and secondary database) to send and receive sequences of messages, such as replicated data, using one or more keypairs and wrapping keys. The sequences of messages can include an initial set of messages that are encrypted by a wrapping key, and further include another set of messages that are encrypted by a replaced staggered key. The sequence of messages can be configured to be decrypted without exporting keys of hardware security modules.

25 Claims, 10 Drawing Sheets

(56) References Cited

U.S. PATENT DOCUMENTS

| | | | | |
|---|---|---|---|---|
| 2004/0083177 | A1* | 4/2004 | Chen | H04N 21/6581 |
| | | | | 705/50 |
| 2005/0050323 | A1* | 3/2005 | Mizrah | H04L 9/0844 |
| | | | | 713/168 |
| 2006/0067592 | A1* | 3/2006 | Walmsley | G06K 15/1857 |
| | | | | 382/303 |
| 2008/0130890 | A1* | 6/2008 | Rigler | H04L 9/0894 |
| | | | | 380/259 |
| 2011/0320400 | A1* | 12/2011 | Namini | G06F 16/21 |
| | | | | 707/610 |
| 2013/0268762 | A1* | 10/2013 | Armatis | H04L 9/0819 |
| | | | | 713/171 |
| 2014/0237231 | A1* | 8/2014 | Spalka | H04L 63/0471 |
| | | | | 713/165 |
| 2016/0050291 | A1* | 2/2016 | Haug | H04L 67/104 |
| | | | | 709/217 |
| 2017/0083709 | A1* | 3/2017 | Simmons | G06F 21/602 |
| 2018/0081983 | A1* | 3/2018 | Carru | H04L 67/02 |
| 2018/0332010 | A1* | 11/2018 | Graber | H04L 9/0631 |

OTHER PUBLICATIONS

Martin Hentshel, "Data Encryption With Customer Managed Keys", Snowflake Blog, May 2017, (Year: 2017).*

Lawrence Miller, "Data Sharing for dummies", ISBN: 978-1-119-49129-3, 2018 (Year: 2018).*

"U.S. Appl. No. 16/863,031, Non Final Office Action dated Jun. 12, 2020", 14 pgs.

"U.S. Appl. No. 16/863,031, Response filed Sep. 14, 2020 to Non Final Office Action dated Jun. 12, 2020", 13 pgs.

"U.S. Appl. No. 16/863,031, Notice of Allowance dated Oct. 16, 2020", 5 pgs.

* cited by examiner

# MESSAGE-BASED DATABASE REPLICATION

CROSS-REFERENCE TO RELATED APPLICATION

This application is a Continuation of U.S. patent application Ser. No. 16/863,031, filed on Apr. 30, 2020, the contents of which are hereby incorporated by reference in their entirety.

TECHNICAL FIELD

The present disclosure generally relates to special-purpose machines that manage databases and improvements to such variants, and to the technologies by which such special-purpose machines become improved compared to other special-purpose machines for transmitting data between networked devices.

BACKGROUND

Databases are used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

In some instances, it may be beneficial to replicate database data in multiple locations or on multiple storage devices. Replicating data can safeguard against system failures that may render data inaccessible over a cloud network and/or may cause data to be lost or permanently unreadable.

Different database systems can use encryption keys to authenticate one another and encrypt data sent between the different database systems. For example, a database instance in one datacenter can use an encryption key to authenticate and receive communications from another database in another datacenter that is located at a different geographic location. As the number of networked systems increases, it can be difficult to manage the links between the systems using keys in a scalable way while maintaining the security of data sent over the links.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
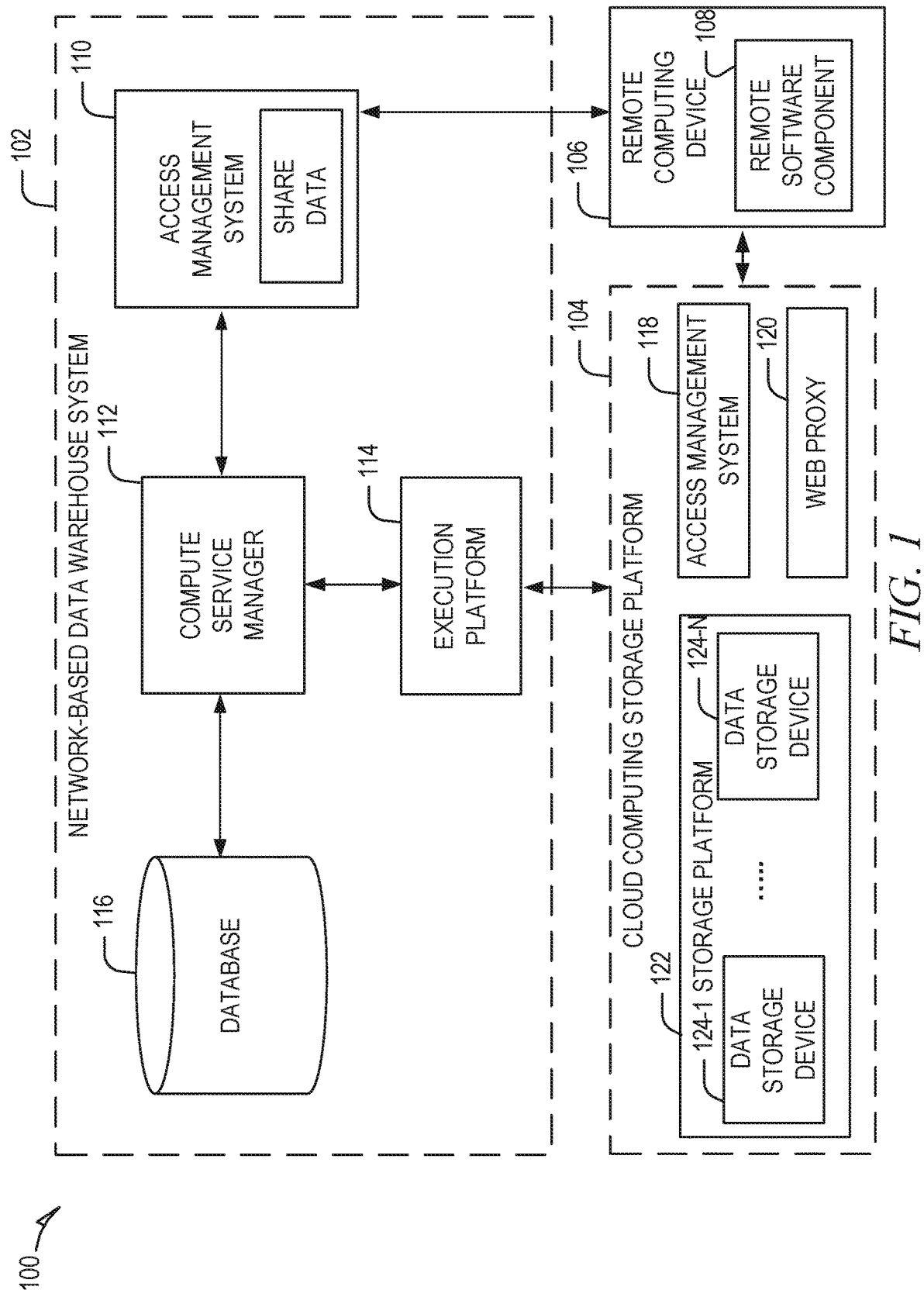
FIG. 1 illustrates an example computing environment in which a network-based data warehouse system can implement streams on shared database objects, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it can be difficult to manage secure network links between database systems. An example networked database system includes a virtual private cloud deployment that uses data storage devices and compute resources dedicated to that deployment. Different deployments can be linked, and channels can be set up to send and receive data between the deployments. For example, deployment_A and deployment_B can create a link over which a stream of data sent between the deployments is encrypted by a shared symmetric key. If multiple deployments are to share data, they can each store the symmetric key, and each can send and receive data using the shared symmetric key, according to some example embodiments.

In some example embodiments, to increase network security, each deployment includes a hardware security module (HSM), which is a physical computing device that safeguards and manages digital keys for strong authentication and provides crypto-processing for that deployment. Example HSMs can be implemented as a plug-in card or server rack module that attaches directly to a computer or network service running within the deployment's cloud execution instances. In some example embodiments, a given deployment's HSM is provided by a cloud provider as a network service, along with the provided execution units (e.g., Amazon S3, Google Cloud, Microsoft Azure each offer HSM services for their cloud compute units, e.g., virtual machines).

In some example embodiments, the encryption key is managed by the HSMs in each deployment. If a mesh of deployments is being configured, this can require importing the symmetric key into another deployment's HSM (e.g., a new deployment that is being added to the mesh, or importing to each deployment in the mesh). For example, to safeguard data, an existing deployment can be replicated, wherein a new deployment is created, the data from the existing deployment is copied or otherwise replicated over to the new deployment, the existing deployment's HSM exports the key, and the new deployment's HSM imports the key. After creation and exporting/importing of the key, the new deployment can function as a secondary or replication deployment that stores data replicated from the existing deployment, which then functions as a "primary" or source deployment.

While HSMs provide strong encryption, HSM processing does not scale well and can increase the processing overhead as more deployments are added to a given networked system. Thus, there is a demand for using non-HSM operations where possible, so long as the non-HSM processing can be performed securely. Furthermore, not all HSMs provide key importing or exporting functions, which inhibits replication of deployments using such systems.

One approach includes creating a public key document that stores each deployment's public key, where new deployments add their public key to the public key document and encrypt outbound messages with the target deployment's public key (which is then decryptable by the target deployment via its private key). However, one issue with this approach is that it can be difficult to manage the public key document in a secure manner, as the number of deployments scale to enterprise levels.

Additionally, even if a given deployment knows the target deployment's public key, that does not ensure that the target deployment is who it says it is. That is, for example, the target deployment may be a compromised or otherwise malicious deployment that is seeking to intercept data by proffering the compromised/malicious deployment's public key to other legitimate deployments in the mesh. Additionally, it is impractical to perform key rotation using the public key document, at least in part because each deployment would need to rotate their keys at the same time, which is difficult to do in practice and can be prone to errors.

To this end, a replication manager can implement asymmetric keys and one or more symmetric keys to transmit data between databases, such as a source deployment (e.g., a primary database) and a target deployment (e.g., one or more secondary or replicated databases). In some example embodiments, each deployment generates a replication asymmetric keypair (RAK) to send and receive encrypted data, and an authentication asymmetric keypair (AAK) that is used to authenticate the given deployment. In some example embodiments, each deployment further generates a symmetric key to encrypt/decrypt each data file sent (e.g., data encryption key (DEK)), and a symmetric wrapping replication key (WRK) which wraps the DEKs, where the WRKs are staggered across messages and constantly changed to further secure the sent data. The replication manager can use these keys in an authentication process and messaging protocol to securely send and receive data between the deployments without reliance on importing/exporting of keys from the HSMs.

Generally, an example asymmetric keypair includes PKI (Public Key Infrastructure) keys comprising a private key and a corresponding public key. The PKI keys are generated by the HSMs using cryptographic algorithms based on mathematical problems to produce one-way functions.

The keypair can be used to securely send data and also to authenticate a given device. To securely send/receive data using an asymmetric keypair, the public key can be disseminated widely, and the private key is kept private to that deployment. In such a system, any sending deployment can encrypt a message using the target deployments' public key, but that encrypted message can only be decrypted with that target deployment's private key.

To use a keypair as signature or authentication mechanism, a signing device uses the private key to "sign" a given data item, and other devices that have access to the public key can authenticate that the signature on the data item is authentic because only the signing device has the private key, and in such systems forging the signature is currently mathematically impractical.

Generally, a symmetric key is a shared secret that is shared between the transmitter and receiver, where the shared secret (e.g., the symmetric key) is used to encrypt the message and also to decrypt the message. An example symmetric key scheme includes Advanced Encryption Standard (AES) 256, which can be generated by the HSM; additional symmetric key schemes include Twofish, Blowfish, Serpent, DES, and others.

FIG. 1 illustrates an example shared data processing platform 100 in which a network-based data warehouse system 102 implements database stream tracking (e.g., view streams), in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing dusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users. For example, data to be tracked via streams can be stored and accessed on the cloud computing storage platform 104 (e.g., on S3) or stored and accessed on the database 116 that is local to the network-based data warehouse system 102, according to some example embodiments.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124 supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing device 106 may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, may be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
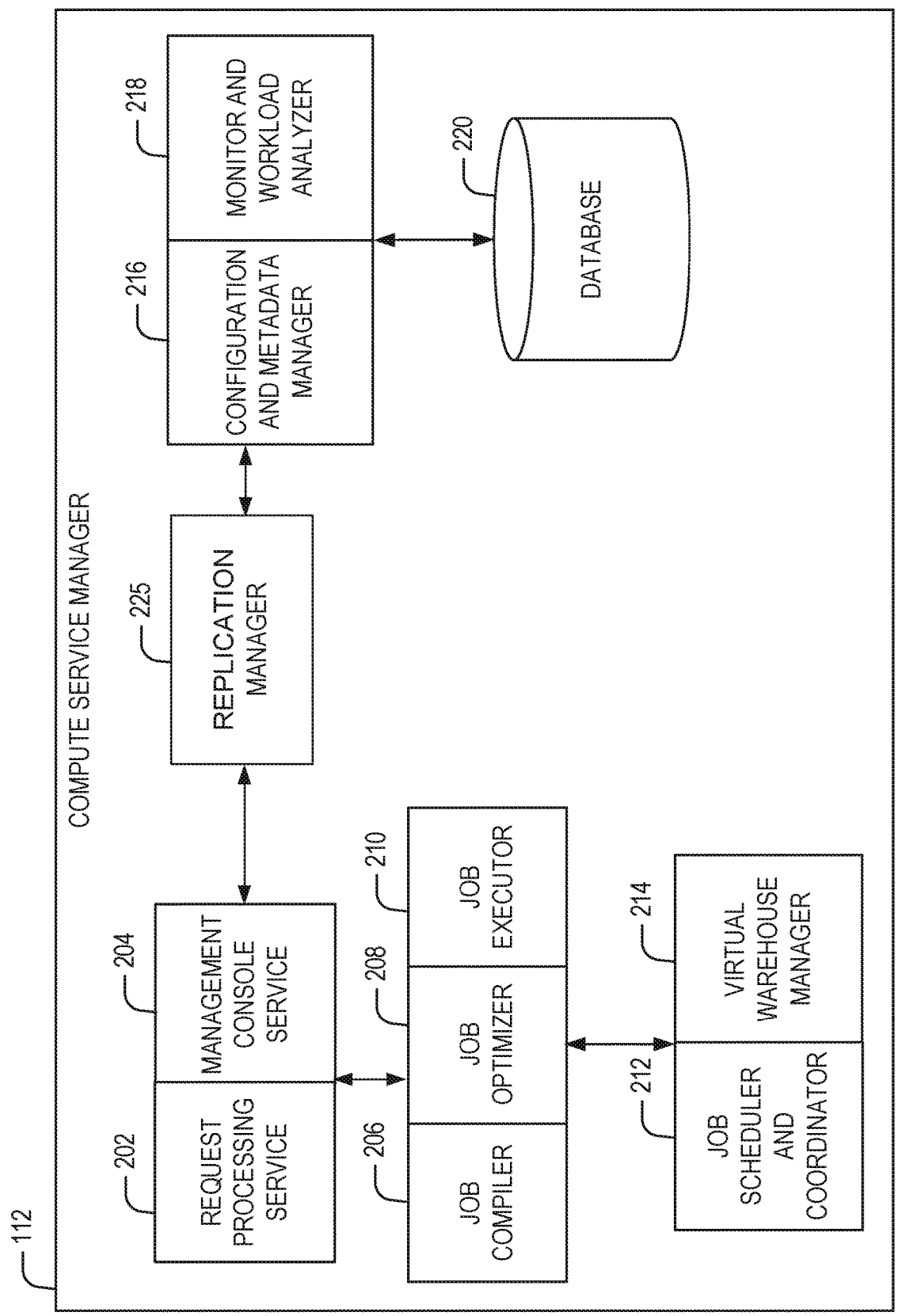
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The replication manager 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. The data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
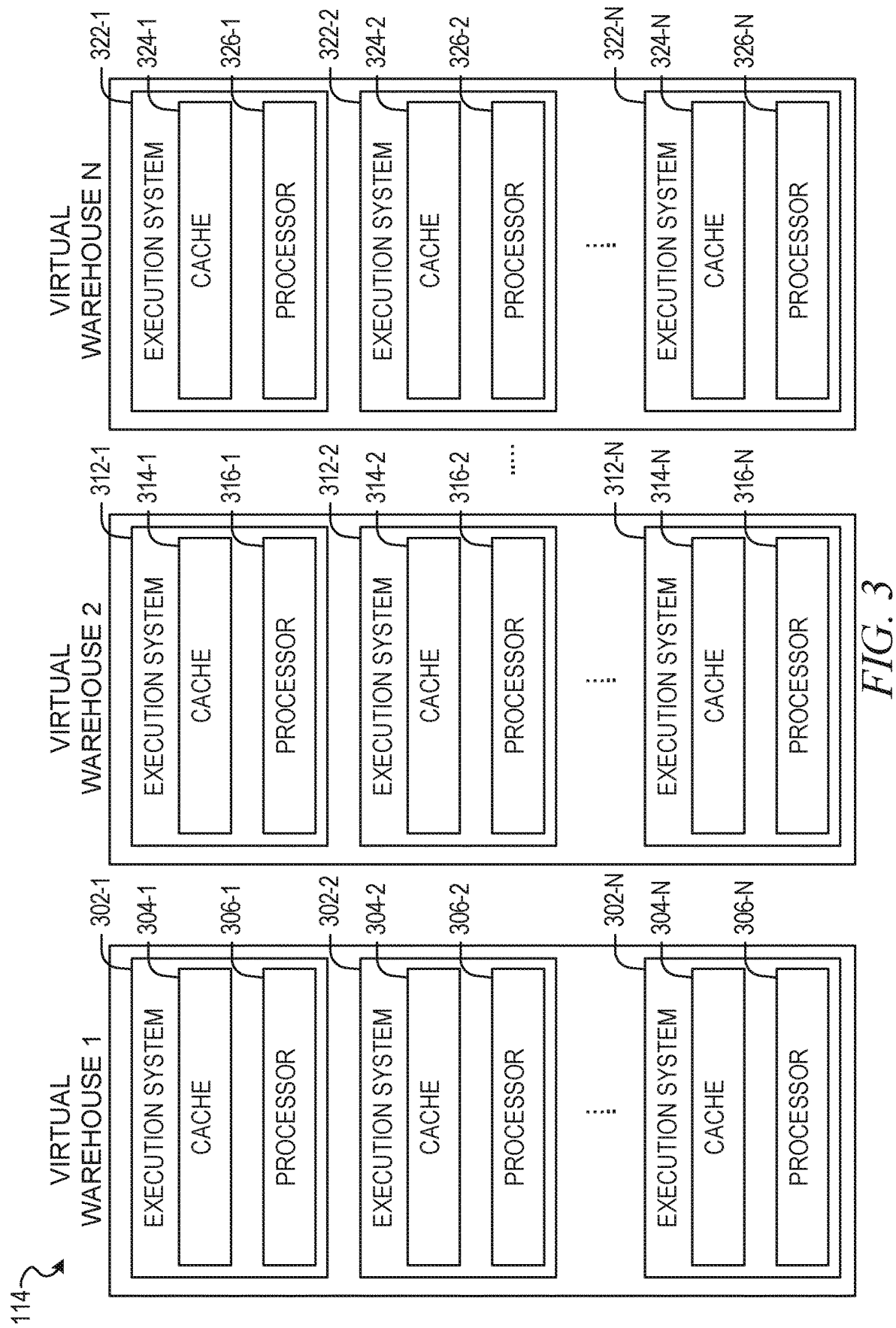
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
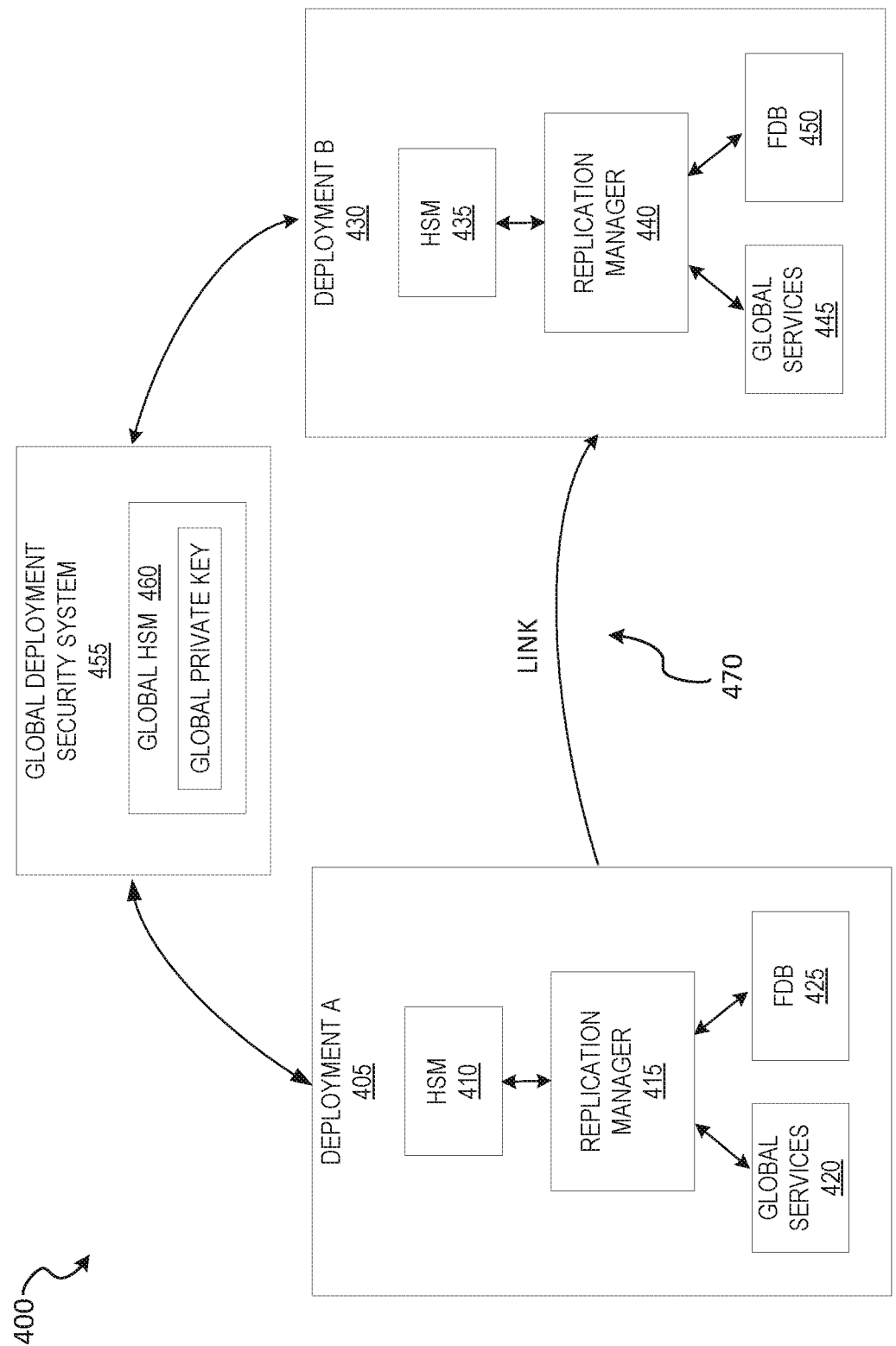
FIG. 4 shows an example database architecture for authentication and sending and receiving data, according to some example embodiments.

FIG. 4 shows an example database architecture 400 for authentication and sending and receiving data, according to some example embodiments. In the example of FIG. 4, deployment_A 405 and deployment_B 430 are example separate instances of shared data processing platform 100 of FIG. 1 with various components discussed in FIGS. 1-3 omitted for clarity.

Deployment_A 405 is an example deployment of shared data processing platform 100 located at a first geographic location (e.g., San Francisco). As illustrated, deployment_A 405 includes a replication manager 415 that manages authentication of the deployment with other deployments (e.g., deployment_B 430 and/or other deployments in a mesh with deployment_A 405 and deployment_B 430). The deployment_A 405 further comprises global services 420, which is a consolidated or representative sub-system including instances of 202, 204, 206, 208, 210, 212, and 214 displayed in FIG. 2. The deployment_A 405 further includes FDB 425 which is another representative sub-system including instances of 216, 218, and 220. The deployment_A 405 further includes HSM 410, which, as discussed, is a hardware security module that can generate and manage encryption keys for the deployment_A 405.

Deployment_B 430 is an example deployment of shared data processing platform 100 located at a second geographic location (e.g., New York City). As illustrated, deployment_B 430 includes a replication manager 440 that manages authentication of the deployment with other deployments (e.g., deployment_A 405 and/or other deployments in a mesh with deployment_A 405 and deployment_B 430). The deployment_B 430 further comprises global services 445, which is a consolidated or representative sub-system including instances of 202, 204, 206, 208, 210, 212, and 214 displayed in FIG. 2. The deployment_B 430 further includes FDB 450 which is another comprised or representative sub-system including instances of 216, 218, and 220.

The database architecture 400 further includes global deployment security system 455, according to some example embodiments. As illustrated, the global deployment security system 455 includes a global HSM 460 which generates an asymmetric keypair, including a global public key and a global private key. The global public key is widely distributed (e.g., to all deployments in the mesh) and can be used by the deployments to check whether an item of data (e.g., a public key of an unknown deployment) was actually signed by the global signing key of global deployment security system 455 (e.g., using PKI signing operations discussed above).

In the following example, deployment_A 405 is the primary database and seeks to send replication traffic to deployment_B 430, though it is appreciated that in reverse processes, the architecture 400 can be implemented to send traffic from deployment_B 430 to deployment_A 405.

In some example embodiments, to authenticate the deployment_A 405, the global deployment security system 455 signs the authentication public key of the deployment_A 405 with the global signing key, thereby indicating to other deployments that the deployment_A 405 is who it says it is (e.g., that is, an authenticated deployment and not a malicious or compromised deployment).

To initiate link 470, deployment_A 405 sends deployment_B 430 the authentication public key of deployment_A 405, which has been signed by the global signing key of global deployment security system 455. Deployment_B 430 the receives the key data, and if the key is not signed by the global deployment security system 455, the deployment_B 430 rejects further communications from the deployment_A 405. Assuming the received public key is signed by the global deployment security system 455, the deployment_B 430 saves network address data (e.g., URLs) and other data describing deployment_A 405 (e.g., tasks/functions) for further communications.

In some example embodiments, after link 470 is established, the deployment_A 405 can send encrypted data to deployment_B 430, such as replication files from one or more of deployment_A's databases (e.g., data storage devices 124 connected to the execution units of deployment_A 405).

To encrypt and decrypt the data sent over the link 470, HSM 410 generates a replication asymmetric key pair for deployment_A 405, and HSM 435 generates a replication asymmetric key pair for deployment_B 430, where the public keys from of each deployment can be widely spread and used to encrypt data sent to the destination deployment.

For example, in some example embodiments, deployment_A 405 sends a data file encrypted with the public key of deployment_B 430, so that only deployment_B 430 can decrypt the file. Further, each data message may initially be encrypted using a data encryption key (DEK) and further encrypted using a wrapping replication key (e.g., a symmetric key different than the DEK), which can be included in the files sent to the destination deployment, e.g., deployment_B 430, as discussed in further detail below.

Although in the above example two different asymmetric key pairs were generated for deployment A—one for authentication and one for sending data—in some example embodiments a single asymmetric keypair is used to both authenticate the deployment and send the encrypted data. For example, a keypair can be generated for deployment_A 405 and the public key of the keypair can be signed by the global private key from the global deployment security system 455. After the public key pair is signed, the deployment_A 405 can send the signed public key to deployment_B 430 to both authenticate deployment_A 405 and send traffic to deployment_A 405. That is, for example, deployment_B 430 receives the signed public key and knows that it can trust deployment_A 405 because the public key is a signed global private key, which only system 455 has access to (e.g., as managed by global HSM 460). Further, the deployment_B 430 can use the signed public key to encrypt and send data back to deployment_A 405, where it is guaranteed that only deployment_A 405 can decrypt the data as only deployment_A 405 has the corresponding private key. In this way, and in accordance with some example embodiments, a single asymmetric keypair is used to both authenticate and send data to a given deployment. Further, although databases are discussed here as illustrative examples, it is appreciated the same key techniques for link 470 can be implemented for any type of devices, such as two networked devices, peer devices, client-server devices, and others.

Figure 5:
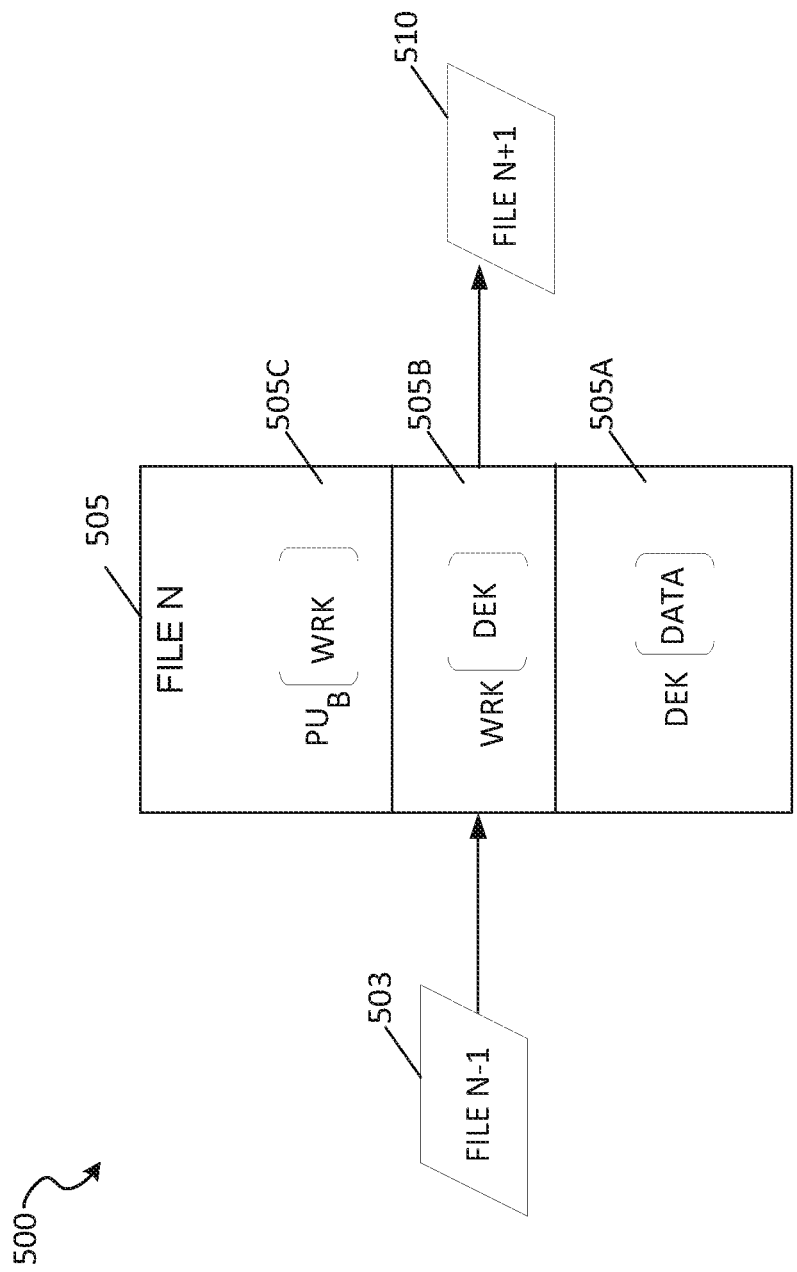
FIG. 5 shows a messaging structure for data transmission between deployments, according to some example embodiments.

FIG. 5 shows a messaging structure 500 for data transmission between deployments, according to some example embodiments. For example, the messaging structure 500 can be a stream of replication database items sent from deployment_A 405 to deployment_B 430. As illustrated in file 505, the file structure can include bytes (e.g., byte stream) that correspond to different parts of the file 505 including part 505A, part 505B, and part 505C. In some example embodiments, part 505A corresponds to the message or file's body and stores the replication data (e.g., "data" in part 505A), and part 505B and 505C are parts of a file's header structure. In the messaging structure 500, the data for each file is encrypted by a DEK. For example, as illustrated in part 505A, the data has been encrypted by a DEK for that file 505. In some example embodiments, the data of each file send is encrypted by a different DEK. That is, for example, data in the previous file 503 is decrypted by a different DEK, and data in the subsequent file 510 is decrypted in a different DEK and each file encrypted using a unique DEK.

As illustrated in part 505B, the DEK is then encrypted by the wrapping replication key (WRK), where the WRK for the file is generated by the sending deployment's HSM. That is, for example, the HSM 410 of deployment_A 405 generates a symmetric key as the WRK, and uses the WRK to encrypt the DEK of file 505, which is included in the part 505B.

Further, as illustrated in part 505C, the WRK is then encrypted by the public key of the destination or target deployment. For example, with reference to FIG. 4, if the deployment_B 430 is the destination deployment, the HSM 435 generates an asymmetric keypair, and the public key of the keypair is used to encrypt the WRK for the file 505, and the encrypted version of the WRK is then included in the file in the part 505C.

As an example, upon receiving the file 505, the destination deployment uses its private key to decrypt and obtain the WRK for file 505. After the WRK is obtained it is then used to decrypt and access the DEK, which is then followed by using the DEK to decrypt the data of the file 505.

In some example embodiments, the WRK is periodically changed to increase the security of files sent over the linked deployments. For example, the HSM of the sending deployment can generate a new WRK every fifteen minutes (or other custom time period), and the new WRK is used to encrypt subsequently sent files. For example, if file 503 and file 505 are in a first fifteen minute period and file 510 is in the next fifteen minute period, then the same WRK is used to decrypt the respective DEKs of file 503 and file 505, and a different newly generated WRK is used to encrypt/decrypt the DEK of file 510. In some example embodiments, the encrypted WRK (as encrypted by the public key of the destination deployment_B 430) is cached on the sending deployment, because the encrypted WRK will likely be used in a string of messages until the WRK is regenerated by the HSM of the sending deployment. Upon generation of a replacement key, the new value is then encrypted using the public key of the destination deployment and the encrypted value is then cached.

Figure 6:
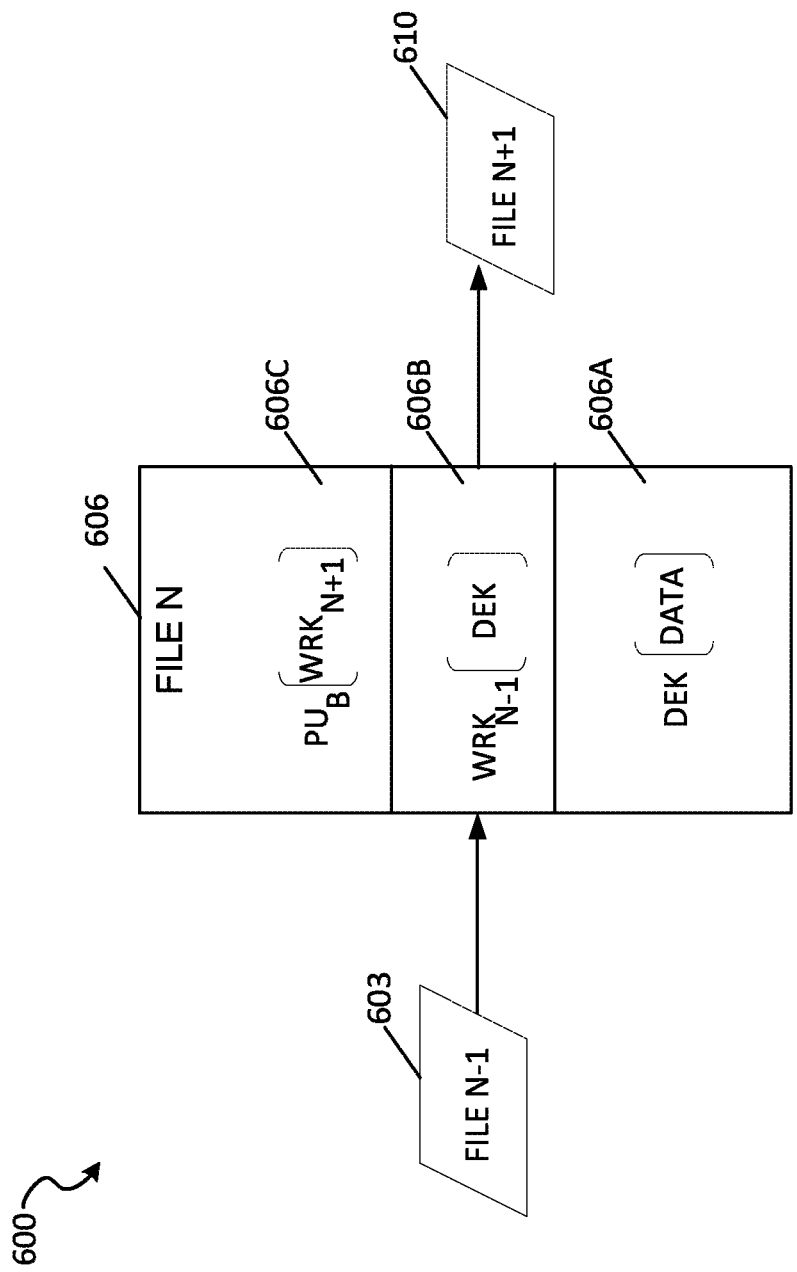
FIG. 6 shows a staggered messaging structure for data transmission between deployments, according to some example embodiments.

FIG. 6 shows a staggered messaging structure 600 for data transmission between deployments, according to some example embodiments. In the example of FIG. 6, the WRKs are staggered to increase security of the files sent between the deployments. In the following description, "−1" denotes a previous item, such as previously sent file or a WRK key previously sent, and "+1" denotes a subsequent item, such as a file that is created and is to be sent after the initial or previous file.

In the example, the messaging structure 600 can be a stream of replication database items sent from deployment_A 405 to deployment_B 430. As an example, file 603 is the first item that is generated and then sent to the destination, which is followed by file 606, which is created and then sent to the destination, which is followed by file 610, which is the last file in the example of FIG. 6 to be generated and sent to the destination (e.g., deployment_B 430, a server, virtual machine, etc.). At a high level, each file is staggered in that the data encrypted in the file is accessed through an encryption key that is sent in another file, such as the previously sent file. For example, file 603 specifies the WRK that is to be used to access the data in file 606, and file 606 species the WRK to be used to access the data in file 610, and so on. When the destination device receives file 603, it stores WRK in file 603 for use in decrypting the file in the next file, i.e., file 606, and so on.

In particular, and in accordance with some example embodiments, as illustrated in file 606, the file structure can include bytes (e.g., byte stream) that correspond to different parts of the file 606 including part 606A, part 606B, and part 606C.

In some example embodiments, part 606A and part 606B correspond to the message or file's body and store the replication data (e.g., "data" in part 606A, such as database values) as well as staggered WRK data (e.g., the WRK key for the next file), and part 606C is part of a file's header structure. In other example embodiments, each of the parts 606A-C is part of the message body, and the header stores ID data for which WRK key and public key to use for that message in identifying correct keys after key rotations.

In the messaging structure 600, the data for each file is encrypted by a DEK. For example, as illustrated in part 606A, the data has been encrypted by a DEK for that file 606. In some example embodiments, the data of each file send is encrypted by a different DEK. That is, for example, data in the previous file 603 is decrypted by a different DEK, and data in the subsequent file 610 is decrypted in a different DEK and each file encrypted using a unique DEK.

As illustrated in part 606B, the DEK of file 606 is encrypted by a WRK which was received in the previous file 603. That is, the WRK used to encrypt the DEK in file 606 was previously received in the file 603. As illustrated in part 606C, the WRK for the next file ("WRK+1"), file 610 ("file N+1"), is encrypted by the public key of the destination deployment, such as deployment_B 430. In some example embodiments, the encrypted WRK is cached in one or more sending deployments so that one or more messages to be sent to the destination deployment can use the cached encrypted WRK.

Accordingly, the WRKs are staggered and the WRK included in a given file is the WRK for the next file to be received. In this way, if the file 606 is maliciously intercepted, the DEK for that file cannot be accessed because the DEK is encrypted with a WRK that was sent in a previous message (e.g., file 603).

As an example, upon receiving file 603, the destination deployment uses its private key to access the next file, which is file 606. When the destination deployment receives file 606, it accesses the DEK in part 606B using the previously stored WRK from file 603, and then uses the DEK to access the data of file 606 (e.g., in part 606A).

Figure 7:
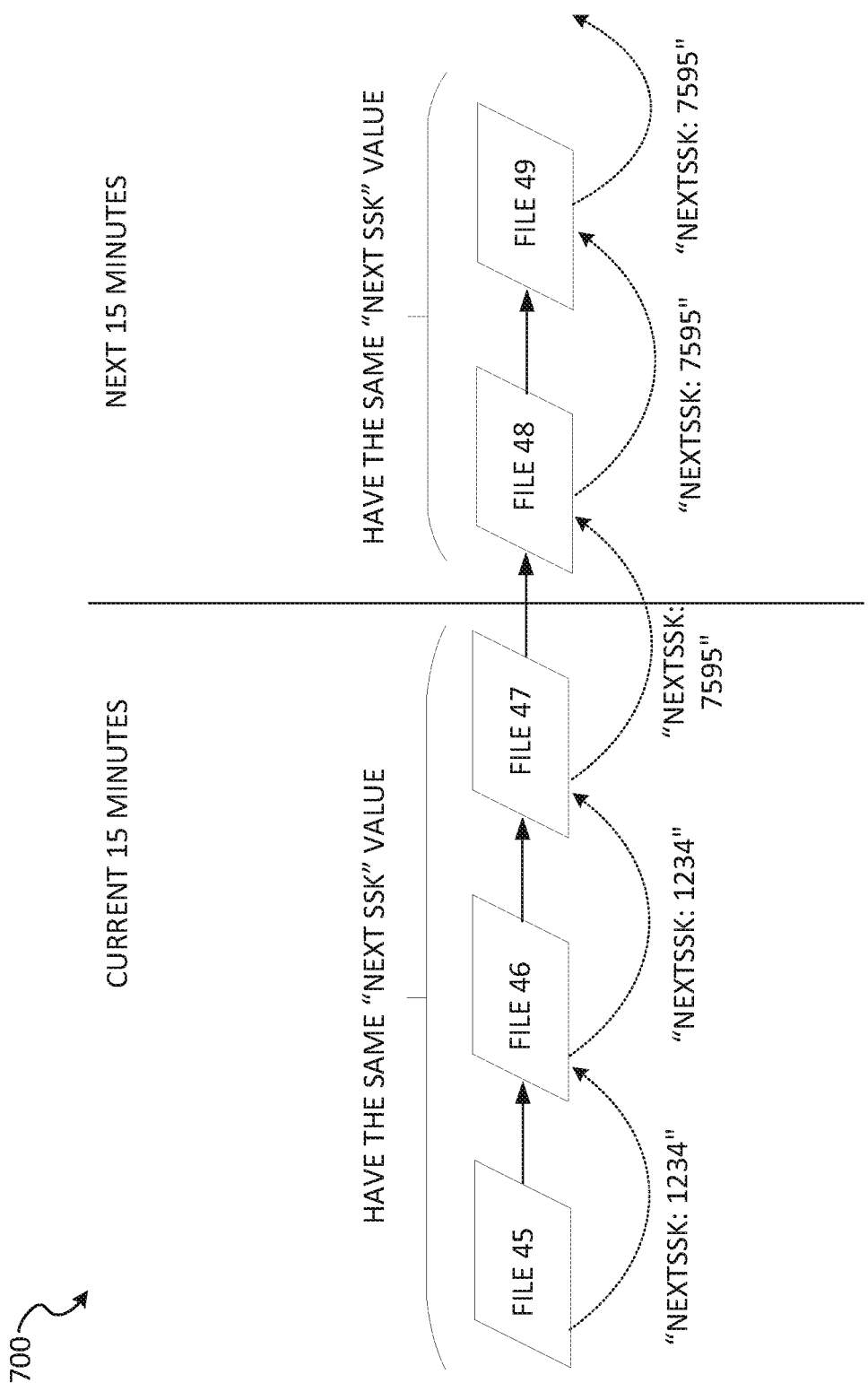
FIG. 7 shows an example data architecture for changing wrapping replication keys (WRKs) of files sent between deployments, according to some example embodiments.

Further, according to some example embodiments, the WRKs are periodically or spontaneously changed to increase security of the files sent between the linked deployments. For example, FIG. 7 shows an example data architecture 700 for changing WRKs of files sent between deployments, according to some example embodiments. In the example of FIG. 7, file 45, file 46, and file 47 are all sent within the same time period (e.g., within 3:00 PM to 3:15 PM), and file 48 and file 49 are sent in the next time period (e.g., within 3:16 PM to 3:30 PM).

Further, each file has what the WRK is for the next file; thus within a given time period there will be several messages that all have identical values for what the WRK is for the next file. Upon transitioning to the new time period, the latest file will indicate what the newly generated WRK is for the next time period. For example, FIG. 7 indicates that the WRK has changed from "1234" to "7595", after which point the subsequent file (e.g., file 48, file 49, and later sent files) all recite the same next WRK values in their respective message file parts as discussed in FIG. 6.

In some example embodiments, the configuration for when a new WRK should be generated can be configured on a time limit (e.g., every 15 minutes, every hour, once a day), message limit (e.g., every 100 messages). Further, in some example embodiments, when a WRK is generated it can be configured to be random, so that a new WRK is randomly generated and there is no discernable pattern when the WRK is going to be generated. For example, after 6 minutes the WRK can be changed, and then after 16 minutes the WRK can be changed, and in each case, because the WRK is staggered the destination deployment will have received and stored the next WRK to be used, while obfuscating file transmission patterns to malicious entities.

One benefit of the replication manager 225 is that it facilitates key rotation of the WRK and of the public keys of all the deployments. For example, if the destination deployment rotates its public key (e.g., a new keypair is generated for security purposes), the new public key can be distributed, but the WRKs of the respective sending deployments are not affected by the destination deployment's key rotation. In some example embodiments, each message further has a public key ID that identifies which public key of the destination deployment was used to encrypt the WRK in the message (e.g., which can be a WRK to access data within that message, as in FIG. 5, or be a WRK of a subsequent message). Additionally, replication manager 225 handles changing or rotation of WRKs in an efficient manner. When a WRK is rotated for a given sending deployment (e.g., every 15 minutes, every hour), the WRK can be implemented in the stream of messages without affecting the public keys and other data in the stream. In some example embodiments, each message further includes a WRK ID that specifies the ID (e.g., hash) of the WRK currently being used for that time period. Further, in some example embodiments, the link between the deployments (e.g., link 470) is used to implement rotation deployment public keys. In some example embodiments, the public keys used by each deployment are automatically rotated by when they are more than 30 days old. In key rotation, the active or current keys are retired, and new keys are created. Regular key rotation limits the lifecycle for the keys to a limited period of time. In some approaches, the new keys being rotated to need be signed by the global deployment security system 455 before they are used to encrypt data. In some example embodiments, the global deployment security system 455 is not used to sign newly rotated-to keys, and instead the existing secure link is used to pass the new key, and since the message containing this key is signed and encrypted with the current encryption and signing keys, this message is trusted and used to rotate the key. In this way, the deployments can use the existing secure links to send rotated to public keys, so that other deployments can use those newly rotated-to public keys to generated encrypted data for transmission to the given deployment. In some example embodiments, the public keys are rotated periodically or based on a message limit in a similar manner to the WRK in FIG. 7 is rotated. That is, for example, the public key of the destination can be rotated every few days, few hours, or 30 days, where the newly rotated-to public keys are distributed to the other deployments using the existing secure links as discussed above.

Figure 8:
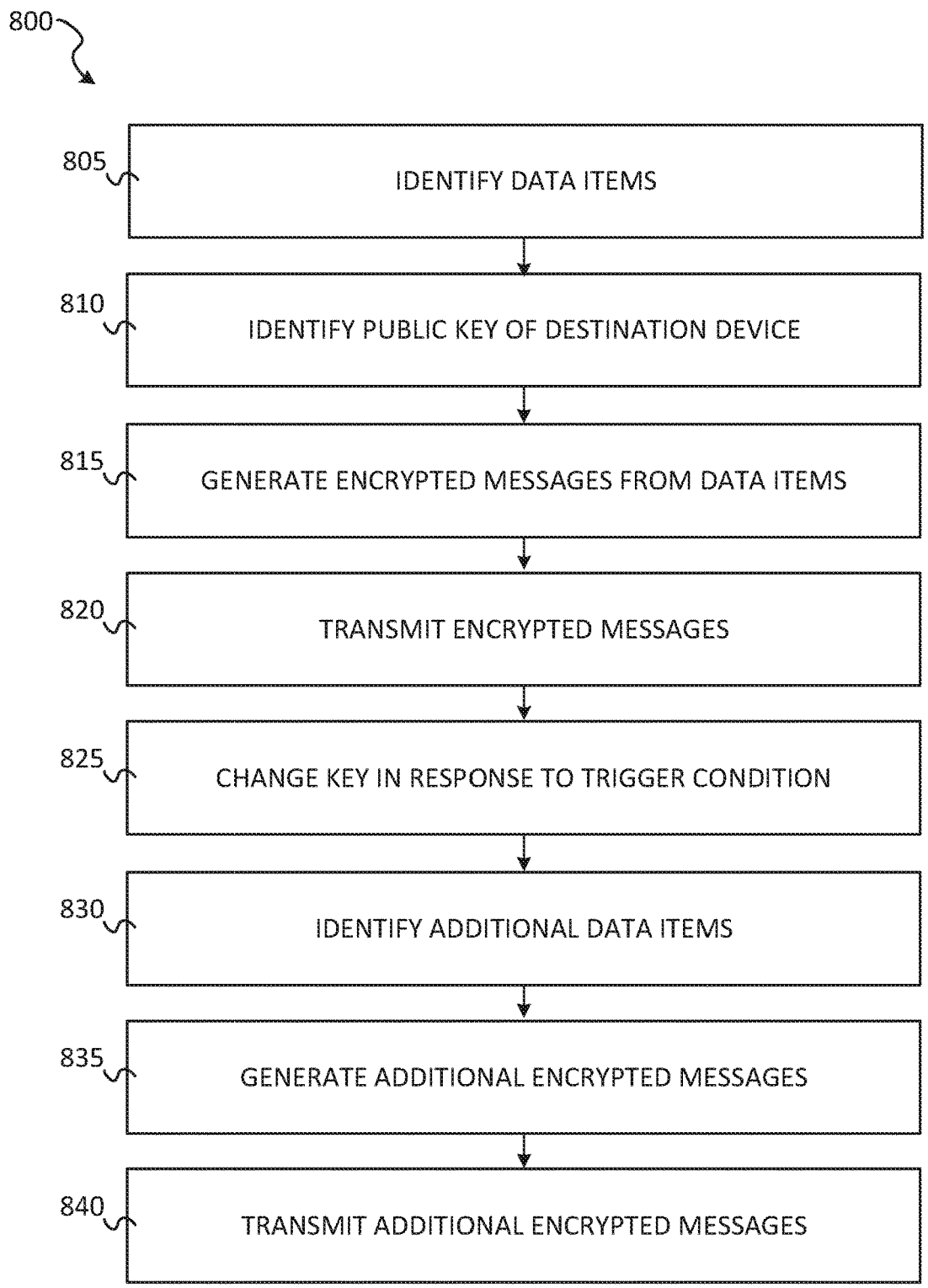
FIG. 8 shows a flow diagram of a method for generating and sending database data using a replication manager, according to some example embodiments.

FIG. 8 shows a flow diagram of a method 800 for generating and sending database data using a replication manager 225, according to some example embodiments. At operation 805, the replication manager 225 identifies data items. For example, at operation 805, the replication manager 225 identifies replication data from a primary database (e.g., deployment_A 405) that is to be replicated to a secondary database (e.g., deployment_B 430).

At operation 810, the replication manager 225 identifies a public key of the destination device. For example, at operation 810, the replication manager 225 may receive the public key from the secondary database for use in sending encrypted traffic to the secondary database. As discussed above, and in accordance with some example embodiments, the public key is signed by a trusted authority, such as the global deployment security system 455.

In some example embodiments, the operation 810 is omitted and instead the wrapping replication key as encrypted by the public key of the destination device is identified instead. That is, for example, the public key was received and used to encrypt the wrapping replication key, which is then stored in memory of the primary database. The stored replication key that is already encrypted by the public key of the destination device can then be efficiently retrieved from memory and included in one or more messages (e.g., included in part 505C, FIG. 5; included in part 606C, FIG. 6).

At operation 815, the replication manager 225 generates encrypted messages from the data items identified at operation 805. In some example embodiments, at operation 815, a wrapping symmetric key generated by the primary database's HSM and the generated wrapping replication key is then included in each message for use in accessing the data included within that same message. For example, as discussed above with reference to FIG. 5, the data of a given message is accessed using the wrapping replication key that is also stored within that same message (e.g., file 505, FIG. 5). Additionally, as discussed above in FIG. 5, in some example embodiments, the data of the given message is first encrypted by a data encryption key (DEK), which is then encrypted by the HSM-generated wrapping replication key (WRK), which is in turn encrypted by the public key of the destination deployment keypair.

In alternative example embodiments, at operation 815, the WRK generated by the sending deployment's HSM for a given message is actually the WRK for the next message in the sequence of messages, as discussed above with reference to FIG. 6. For example, the replication manager 225 encrypts the data of a current file with a DEK for that current file, followed by encrypting the DEK with a WRK, where the WRK is specified in a prior message, followed by encrypting the next message's WRK that should be used by the recipient to decrypt the next message, after receiving the current message.

In some example embodiments, encrypted messages include a first encrypted message that functions as an opening message to create a link between the source database (e.g., deployment_A 405) and the destination database (e.g., deployment_B 430). In those example embodiments, the opening message comprises a data encryption key (DEK) used to encrypt the opening message data, where the opening message data includes the WRK that is to be used to decrypt the next message, as part of a staggered WRK approach discussed in FIG. 6. Further, in some example embodiments, the public key included in the opening message is signed by a trusted authority, such as global deployment security system 455. In some example embodiments, the public key included in the opening message is the same public key that is used to send subsequent messages (e.g., replication messages). In other example embodiments, the public key that is included in the opening message is a public key that is only used for authentication purposes, and another public key is used in subsequent messages (e.g., subsequently sent replication traffic). For example, a sending deployment may generate two keypairs: a signing keypair and a replication keypair, where the public key of the signing keypair is signed by global deployment security system 455 and included in the opening message, whereas the public key of the replication keypair is used in the messages after the opening messages (e.g., in replication messages).

At operation 820, the replication manager 225 transmits the encrypted messages. For example, with reference to FIG. 4, at operation 820, replication manager 415 transmits the messages to replication manager 440 over link 470.

At operation 825, the replication manager 225 changes the WRK key in response to a trigger condition. For example, in response to a trigger event, such as time period ending (e.g., 15 minutes, 1 hour), or a pre-configured number of messages being sent (e.g., 1000 messages), the HSM in the primary database generates a new WRK to be used in the next set of messages to be sent.

At operation 830, the replication manager 225 identifies additional data items. For example, after the new WRK is generated, new replication data to be sent to the replication database is identified at operation 830. At operation 835, the replication manager 225 generates additional encrypted messages using the additional data items, as discussed in FIG. 5 and FIG. 6 above. At operation 840, the replication manager 225 transmits the additional encrypted messages to the secondary database for replication.

Figure 9:
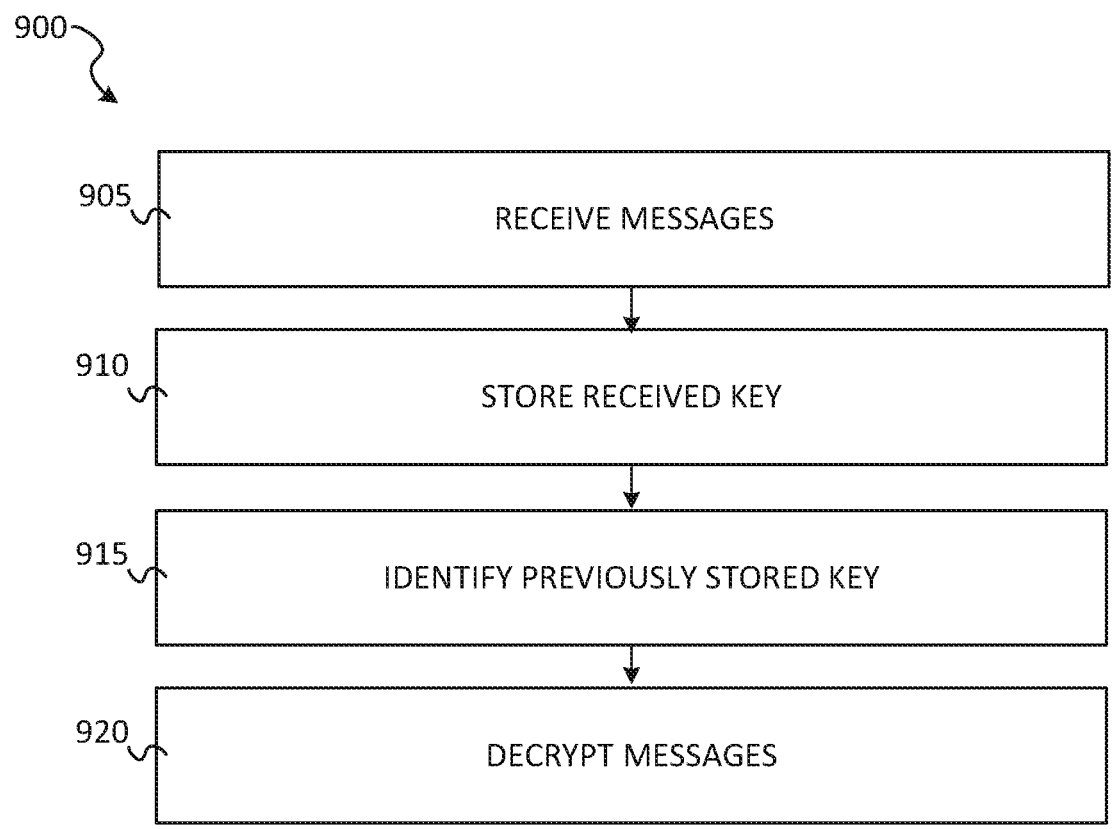
FIG. 9 shows an example flow diagram of a method for receiving messages using a replication manager, according to some example embodiments.

FIG. 9 shows an example flow diagram of a method 900 for receiving messages using a replication manager 225, according to some example embodiments. In the example of FIG. 9, the replication manager 225 is part of the receiving device (e.g., secondary database, replication database, replication manager 440 in deployment_B 430, FIG. 4) that receives encrypted messages from a sending device (e.g., Primary database, source database, deployment_A 405) that are generated and transmitted using method 800.

At operation 905, the replication manager 225 receives encrypted messages. For example, at operation 905, the replication manager 225 receives the file 606 (FIG. 6), which is part of a staggered sequence of messages. At operation 910, the replication manager 225 stores the WRK in the received file for use in decrypting a subsequent message. For example, the replication manager 225 of the recipient device receives the file 606, decrypts the WRK that is in the file 606 using the public key of the recipient device, and stores the decrypted WRK in memory for use in decrypting the data of the next message (e.g., for use in decrypting the DEK in file 610).

At operation 915, the replication manager 225 identifies a previously stored WRK in memory. For example, continuing the example, with reference to FIG. 6, if at operation 905 the file 606 is received, then at operation 915 the replication manager identifies the WRK from file 603, which was previously received by the recipient device.

At operation 920, the replication manager 225 decrypts the message data. For example, at operation 920 the replication manager 225 decrypts the DEK of the message using the WRK from the previous message, and then decrypts the message's data using the DEK.

Although method 900 shows storing of the key at operation 910 followed by decrypting the message data at operation 920, it is appreciated that the operations can be reordered depending on where the WRK is stored within the given message. For example, and in accordance with some example embodiments, in a given message, the WRK may be included as part of the message payload (i.e., the data in the message body that is encrypted by the DEK). Accordingly, in those example embodiments, operation 920 may be implemented first to acquire the WRK for the subsequent message, following by storing the WRK for the next message in memory.

In some example embodiments, operations 910 and 915 are omitted from method 900. For example, if the message received at operation 905 includes the WRK in that message to decrypt the DEK in that same message, then the operation proceeds directly from operation 905 to operation 920 as all the keys needed to access the message data are already in the message, as discussed in FIG. 5 above.

Figure 10:
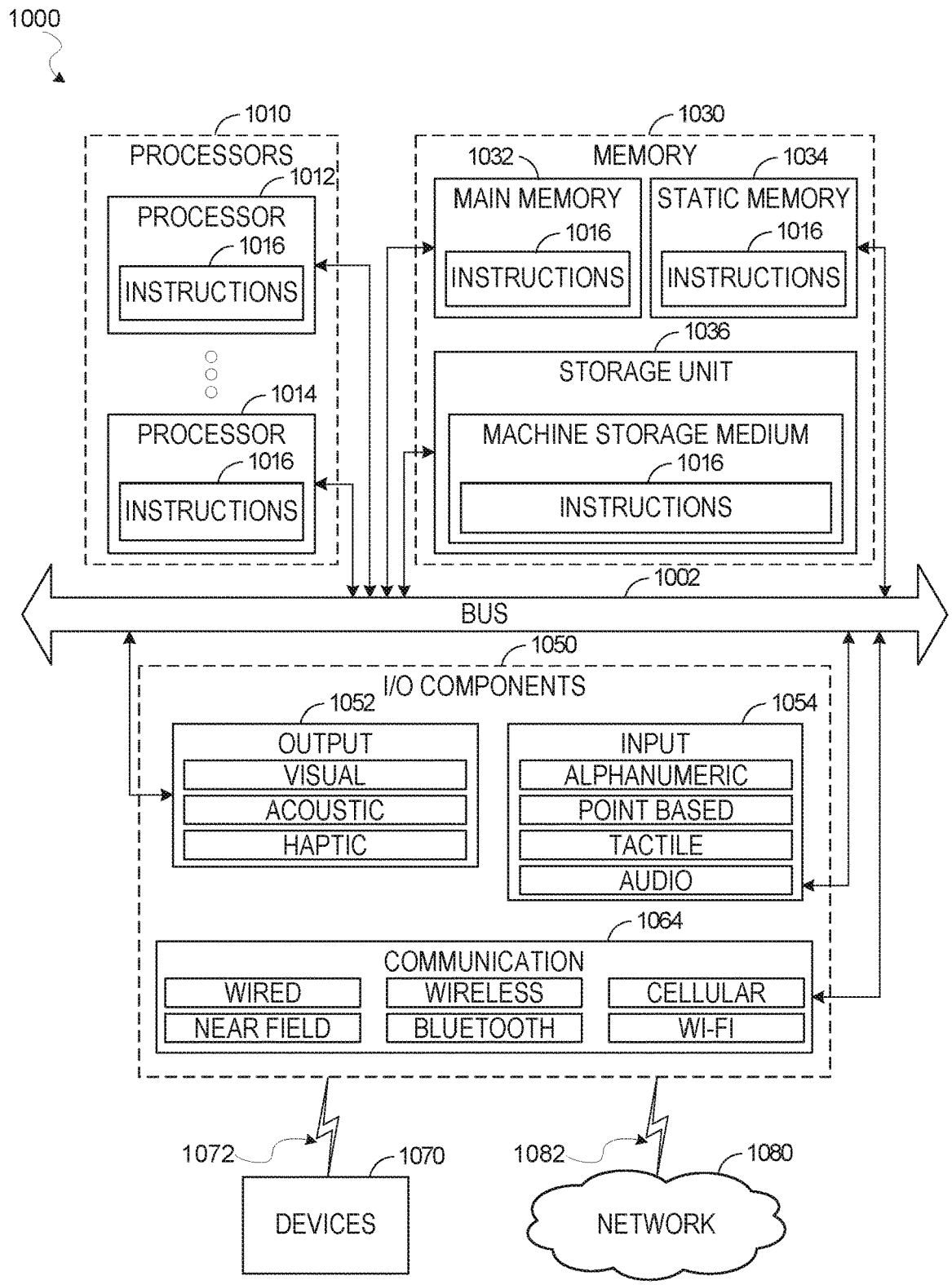
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of any one or more of the methods 800 and 900. As another example, the instructions 1016 may cause the machine 1000 to implement portions of the data flows illustrated in any one or more of FIGS. 1-9. In this way, the instructions 1016 transform a general, non-programmed machine into a particular machine 1000 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the remote computing device 106, the access management system 110, the compute service manager 112, the execution platform 114, the access management system 118, the Web proxy 120, and the devices 1070 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless IAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 800 and 900 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

The following numbered examples are embodiments:

Example 1

A method comprising: identifying, by a network device, a public key of a keypair managed by a remote network device; generating a sequence of encrypted messages for transmission to the remote network device, the sequence of encrypted messages comprising initial encrypted messages and subsequent encrypted messages that are generated after the initial encrypted messages, each of the initial encrypted messages comprising file data encrypted by an initial symmetric key that is generated by the network device, each of the initial encrypted messages comprising the initial symmetric key in encrypted format as encrypted by the public key of the remote networked database, each of the subsequent encrypted messages comprising file data encrypted by a subsequent symmetric key that is generated by the network device to replace the initial symmetric key, each of the subsequent encrypted messages comprising the subsequent symmetric key encrypted by the public key of the remote networked database; and transmitting the sequence of encrypted messages to the remote networked database.

Example 2

The method of example 1, wherein file data in each initial encrypted message is decryptable using the initial symmetric key included within the initial encrypted message.

Example 3

The method of any of examples 1 or 2, wherein file data in each subsequent encrypted message is decryptable using the subsequent symmetric key included within in the subsequent encrypted message.

Example 4

The method of any of examples 1-3, wherein each initial encrypted message stores an initial symmetric key to decrypt file data in a next initial encrypted message of the initial encrypted messages.

Example 5

The method of any of examples 1-4, wherein each particular subsequent encrypted message stores the subsequent symmetric key for a next subsequent encrypted message that occurs after the particular subsequent encrypted message.

Example 6

The method of any of examples 1-5, further comprising: in response to an end of a preconfigured time period, generating the subsequent symmetric key to replace the initial symmetric key.

Example 7

The method of any of examples 1-6, further comprising: in response to a preconfigured quantity of initial encrypted messages being generated, generating the subsequent symmetric key to replace the initial symmetric key.

Example 8

The method of any of examples 1-7, further comprising: in response to a randomized trigger event being generated by the networked database, generating the subsequent symmetric key to replace the initial symmetric key.

Example 9

The method of any of examples 1-8, wherein the randomized trigger event comprises a randomly generated message limit.

Example 10

The method of any of examples 1-9, wherein the randomized trigger event comprises a randomly generated time limit.

Example 11

The method of any of examples 1-10, wherein the file data of each initial encrypted message is encrypted by a unique data encryption key (DEK), wherein the DEK in each initial encrypted message is encrypted by the initial symmetric key stored within the initial encrypted message.

Example 12

The method of any of examples 1-11, wherein the remote network device receives an initial encrypted message of the initial encrypted messages and decrypts the initial symmetric key in the initial encrypted message using a corresponding private key of the keypair managed by the remote networked database, followed by decrypting the DEK of the initial encrypted message using the initial symmetric key, followed by decrypting the file data of the initial encrypted message using the DEK as decrypted by the initial symmetric key.

Example 13

The method of any of examples 1-12, wherein file data in each initial encrypted message is encrypted by a unique data encryption key (DEK), wherein for a given initial encrypted message, the DEK is encrypted by an initial symmetric key stored in a previous initial encrypted message.

Example 14

The method of any of examples 1-13, wherein the remote network device receives a first initial encrypted message of the initial encrypted messages, stores a first initial symmetric key from the first initial encrypted message, followed by receiving a second initial encrypted message, wherein the remote network device accesses the file data in the second initial encrypted message by decrypting a DEK of the second initial encrypted message using the first initial symmetric key that is from the first initial encrypted message, followed by decrypting the file data of the second initial encrypted message using the DEK.

Example 15

The method of any of examples 1-14, wherein the sequence of encrypted messages comprises an opening message at a beginning of the sequence of encrypted messages, and wherein the method further comprises: transmitting, by the networked database, the opening message comprising a data encryption key for the opening message, the data encryption key of the opening message being encrypted by the public key of the remote networked database, the opening message comprising file data that is encrypted by the data encryption key, the file data including the initial symmetric key for the next message in the sequence of encrypted messages.

Example 16

The method of any of examples 1-15, wherein the network device and the remote network device are separate database networks.

Example 17

The method of any of examples 1-16, wherein the network device and the remote network device are located in different geographic locations.

Example 18

The method of any of examples 1-17, wherein the network device is a primary database and the remote network device is a replication database to replicate data of the primary database, and wherein the sequence of encrypted messages comprises replication data from the primary data.

Example 19

A system comprising: one or more processors of a machine; and a memory storing instructions that, when executed by the one or more processors, cause the machine to perform operations implementing any one of example methods 1-18.

Example 20

A machine-readable storage device embodying instructions that, when executed by a machine, cause the machine to perform operations implementing one of methods 1-18.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:
1. A method comprising:
 identifying, by a network device, a public key of a keypair managed by a remote network device;
 generating a sequence of encrypted messages for transmission to the remote network device, the sequence of encrypted messages comprising initial encrypted messages and subsequent encrypted messages that are generated after the initial encrypted messages, each of the initial encrypted messages comprising file data encrypted by a unique data encryption key (DEK), the DEK in each initial encrypted message being encrypted by an initial symmetric key included in a previous initial encrypted message in encrypted format as encrypted by the public key of the remote network device, each of the subsequent encrypted messages comprising file data encrypted by a subsequent symmetric key that is generated by the network device to replace the initial symmetric key, each of the subsequent encrypted messages comprising the subsequent symmetric key encrypted by the public key of the remote network device; and
 transmitting the sequence of encrypted messages to the remote network device.
2. The method of claim 1, wherein each particular subsequent encrypted message stores the subsequent symmetric key for a next subsequent encrypted message that is transmitted after the particular subsequent encrypted message.
3. The method of claim 1, further comprising:
 in response to expiration of a preconfigured time period, generating the subsequent symmetric key to replace the initial symmetric key.

4. The method of claim 1, further comprising:
in response to a preconfigured quantity of initial encrypted messages being generated, generating the subsequent symmetric key to replace the initial symmetric key.

5. The method of claim 1, further comprising:
in response to a randomized trigger event being generated by the network device, generating the subsequent symmetric key to replace the initial symmetric key.

6. The method of claim 5, wherein the randomized trigger event comprises a randomly generated message limit.

7. The method of claim 5, wherein the randomized trigger event comprises a randomly generated time limit.

8. The method of claim 7, wherein the sequence of encrypted messages comprises an opening message at a beginning of the sequence of encrypted messages, and wherein the method further comprises:
transmitting, by the network device, the opening message comprising a data encryption key for the opening message, the data encryption key of the opening message being encrypted by the public key of the remote network device, the opening message comprising file data that is encrypted by the data encryption key, the file data including the initial symmetric key for the next message in the sequence of encrypted messages.

9. The method of claim 1, wherein the DEK is a symmetric key generated by the network device.

10. The method of claim 1, wherein the remote network device receives a first initial encrypted message of the initial encrypted messages, stores a first initial symmetric key from the first initial encrypted message, receiving a second initial encrypted message, wherein the remote network device accesses the file data in the second initial encrypted message by decrypting the DEK of the second initial encrypted message using the first initial symmetric key that is from the first initial encrypted message, and decrypting the file data of the second initial encrypted message using the DEK.

11. The method of claim 1, wherein the network device and the remote network device are separate database networks.

12. The method of claim 11, wherein the network device and the remote network device are located in different geographic locations.

13. The method of claim 1, wherein the network device is a primary database and the remote network device is a replication database to replicate data of the primary database, and wherein the sequence of encrypted messages comprises replication data from the primary data.

14. A system comprising:
one or more processors of a machine; and
a memory storing instructions that, when executed by the one or more processors, cause the machine to perform operations comprising:
identifying, by a network device, a public key of a keypair managed by a remote network device;
generating a sequence of encrypted messages for transmission to the remote network device, the sequence of encrypted messages comprising initial encrypted messages and subsequent encrypted messages that are generated after the initial encrypted messages, each of the initial encrypted messages comprising file data encrypted by a unique data encryption key (DEK), the DEK in each initial encrypted message being encrypted by an initial symmetric key included in a previous initial encrypted message in encrypted format as encrypted by the public key of the remote network device, each of the subsequent encrypted messages comprising file data encrypted by a subsequent symmetric key that is generated by the network device to replace the initial symmetric key, each of the subsequent encrypted messages comprising the subsequent symmetric key encrypted by the public key of the remote network device; and
transmitting the sequence of encrypted messages to the remote network device.

15. The system of claim 14, wherein each initial encrypted message stores an initial symmetric key to decrypt file data in a next initial encrypted message of the initial encrypted messages.

16. The system of claim 14, wherein each particular subsequent encrypted message stores the subsequent symmetric key for a next subsequent encrypted message that occurs after the particular subsequent encrypted message.

17. The system of claim 14, the operations further comprising:
in response to expiration of a preconfigured time period, generating the subsequent symmetric key to replace the initial symmetric key.

18. The system of claim 14, wherein the operations further comprise:
in response to a preconfigured quantity of initial encrypted messages being generated, generating the subsequent symmetric key to replace the initial symmetric key.

19. The system of claim 14, the operations further comprising:
in response to a randomized trigger event being generated by the network device, generating the subsequent symmetric key to replace the initial symmetric key.

20. The system of claim 14, wherein the network device and the remote network device are separate database networks.

21. A machine-storage media embodying instructions that, when executed by a machine, cause the machine to perform operations comprising:
identifying, by a network device, a public key of a keypair managed by a remote network device;
generating a sequence of encrypted messages for transmission to the remote network device, the sequence of encrypted messages comprising initial encrypted messages and subsequent encrypted messages that are generated after the initial encrypted messages, each of the initial encrypted messages comprising file data encrypted by a unique data encryption key (DEK), the DEK in each initial encrypted message being encrypted by an initial symmetric key included in a previous initial encrypted message in encrypted format as encrypted by the public key of the remote network device, each of the subsequent encrypted messages comprising file data encrypted by a subsequent symmetric key that is generated by the network device to replace the initial symmetric key, each of the subsequent encrypted messages comprising the subsequent symmetric key encrypted by the public key of the remote network device; and
transmitting the sequence of encrypted messages to the remote network device.

22. The machine-storage media of claim 21, wherein each initial encrypted message stores an initial symmetric key to decrypt file data in a next initial encrypted message of the initial encrypted messages.

23. The machine-storage media of claim 21, wherein each particular subsequent encrypted message stores the subsequent symmetric key for a next subsequent encrypted message that occurs after the particular subsequent encrypted message.

24. The machine-storage media of claim 21, the operations further comprising:
   in response to an end of a preconfigured time period, generating the subsequent symmetric key to replace the initial symmetric key.

25. The machine-storage media of claim 21, wherein the DEK is a symmetric key generated by the network device.

* * * * *